Dec. 28, 1954　　　G. B. PARSONS ET AL　　　2,697,990
LIGHTWEIGHT PASSENGER CAR
Filed Oct. 7, 1948　　　　　　　　　　　　　　　12 Sheets-Sheet 1

INVENTORS
George B. Parsons
Harold G. Anderson
James MacVeigh
BY Robert A. Shields
ATTORNEY Dec. 28, 1954   G. B. PARSONS ET AL   2,697,990
LIGHTWEIGHT PASSENGER CAR Filed Oct. 7, 1948   12 Sheets-Sheet 2

Fig. 2

INVENTORS
George B. Parsons
Harold F. Anderson
James MacVeigh
BY Robert A. Shields
ATTORNEY

Dec. 28, 1954 G. B. PARSONS ET AL 2,697,990
LIGHTWEIGHT PASSENGER CAR
Filed Oct. 7, 1948 12 Sheets-Sheet 3

INVENTORS
George B. Parsons
Harold G. Anderson
James MacVeigh
BY Robert A. Shields
ATTORNEY Dec. 28, 1954  G. B. PARSONS ET AL  2,697,990
LIGHTWEIGHT PASSENGER CAR
Filed Oct. 7, 1948  12 Sheets-Sheet 4

INVENTORS
George B. Parsons
Harold G. Anderson
James MacVeigh
BY Robert A. Shields
ATTORNEY Dec. 28, 1954     G. B. PARSONS ET AL     2,697,990
LIGHTWEIGHT PASSENGER CAR Filed Oct. 7, 1948     12 Sheets-Sheet 5

Fig. 5

INVENTORS
George B. Parsons
Harold G. Anderson
James MacVeigh
BY Robert A. Shield ATTORNEY Dec. 28, 1954  G. B. PARSONS ET AL  2,697,990
LIGHTWEIGHT PASSENGER CAR Filed Oct. 7, 1948  12 Sheets-Sheet 12

INVENTORS
George B. Parsons
Harold G. Anderson
James MacVeigh
BY Robert A. Shelp ATTORNEY

United States Patent Office 2,697,990
Patented Dec. 28, 1954

2,697,990

LIGHTWEIGHT PASSENGER CAR

George B. Parsons, Roosevelt, N. Y., Harold G. Anderson, Fort Lee, N. J., and James MacVeigh, New York, N. Y.; said Parsons and said Anderson assignors to ACF Industries, Incorporated, New York, N. Y., a corporation of New Jersey, and said MacVeigh assignor to Patentes Talgo, S. A., Madrid, Spain, a corporation of Spain Application October 7, 1948, Serial No. 53,176

13 Claims. (Cl. 105—397)

This invention relates to light weight passenger cars and particularly to such cars for travel on rails and having a weight less than half that of existing cars for similar service.

In order for railroads to meet competition of aeroplanes and pleasure automobiles, it is necessary to not only provide fast and frequent service, but to use equipment having a dead weight per passenger ratio comparable to or lower than the dead weight per passenger ratio of aeroplanes and pleasure automobiles. It is also necessary that the rail cars operate at high speeds on existing trackways and without modifying the banking of the curves which must be maintained substantially at their present banking in order to permit passage of slower moving trains such as freight trains. Present day railway passenger cars have approximately one-third of their weight disposed in the trucks which are merely supporting elements for the car body, which in turn must be fully self-supporting. It is an object, therefore, of the present invention to produce a light weight passenger car in which the trucks are wholly eliminated and each body is supported only on two running wheels located adjacent the ends of the car.

A further object of the invention is the provision of a light weight strong bodied car supported on two wheels and having a low center of gravity.

A still further object of the invention is the provision of a light, strong passenger car supported on rail wheels and having its center of gravity located less than two feet above the tops of the running wheels and with its floor located substantially in the plane of the running wheel axles.

Yet another object of the invention is the provision of a light, strong, truckless car supported wholly by its end walls.

These and other objects of the invention will be apparent to persons skilled in the art from a study of the following description and accompanying drawings, in which Fig. 1, Sheet 1, is an elevational view of substantially a complete car.

Figure 1:
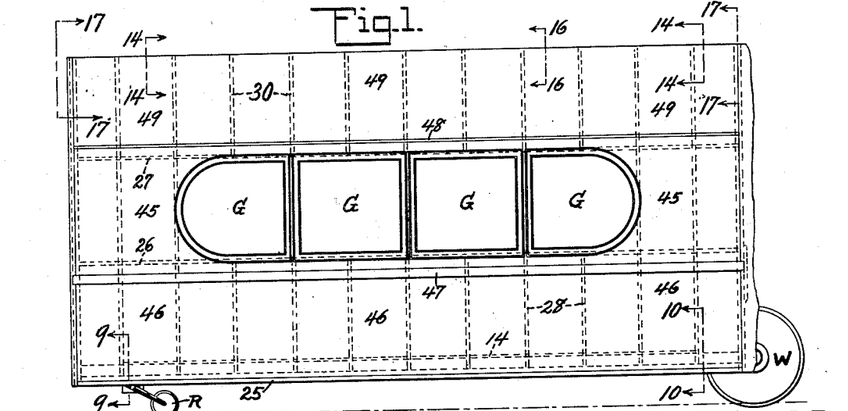

Referring now to the drawings in detail, it will be seen that the car body as shown in Fig. 1 is supported on running wheels W located adjacent the rear end of the car and that the forward end of the car is shown as temporarily supported on jacking or support wheels R. These temporary or jacking wheels are not used when the cars are coupled entrain, but are only used when the car is supported in an out-of-use position as shown. The car body as shown is made up of three main parts, namely, the two side and half roof sub-assemblies which are connected together at the longitudinal center line of the car, and the one underframe unit which connects the lower ends of the side and half roof elements.

Figure 6:
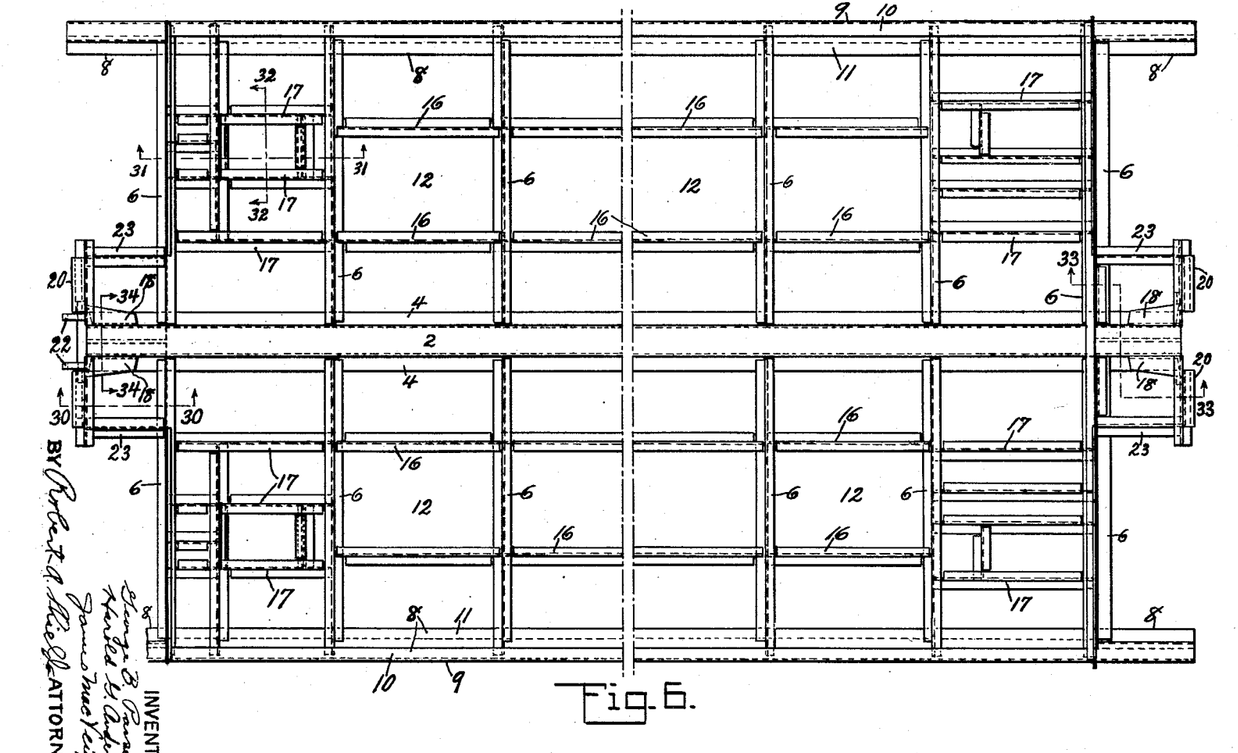
Fig. 6, Sheet 6, is a plan view of the underframe.
Figure 7:
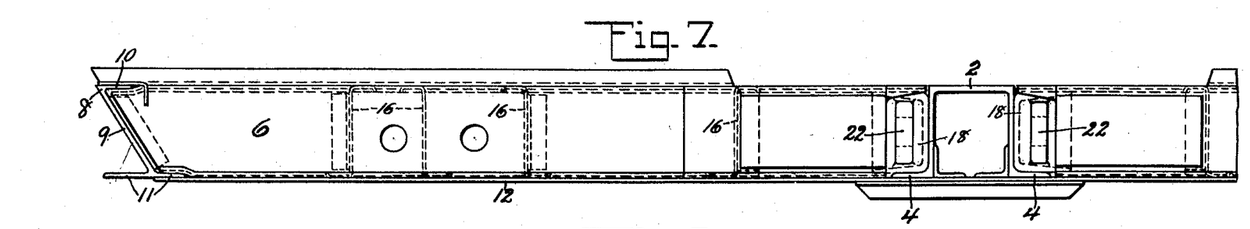
Figs. 7 and 8, Sheet 7, are front and rear end views respectively of the underframe.
Figure 8:
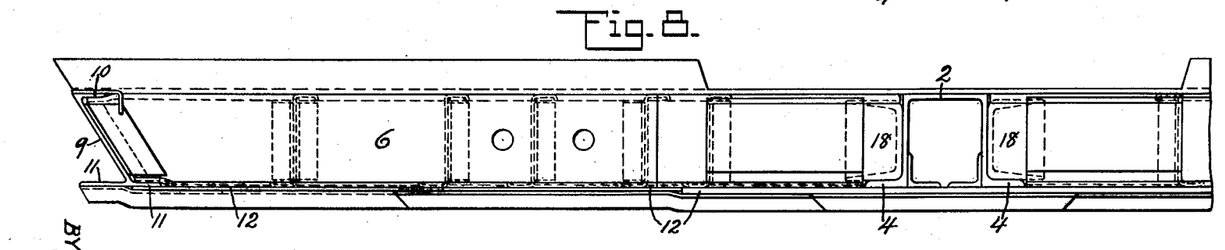
Figures 9, 10, 27:
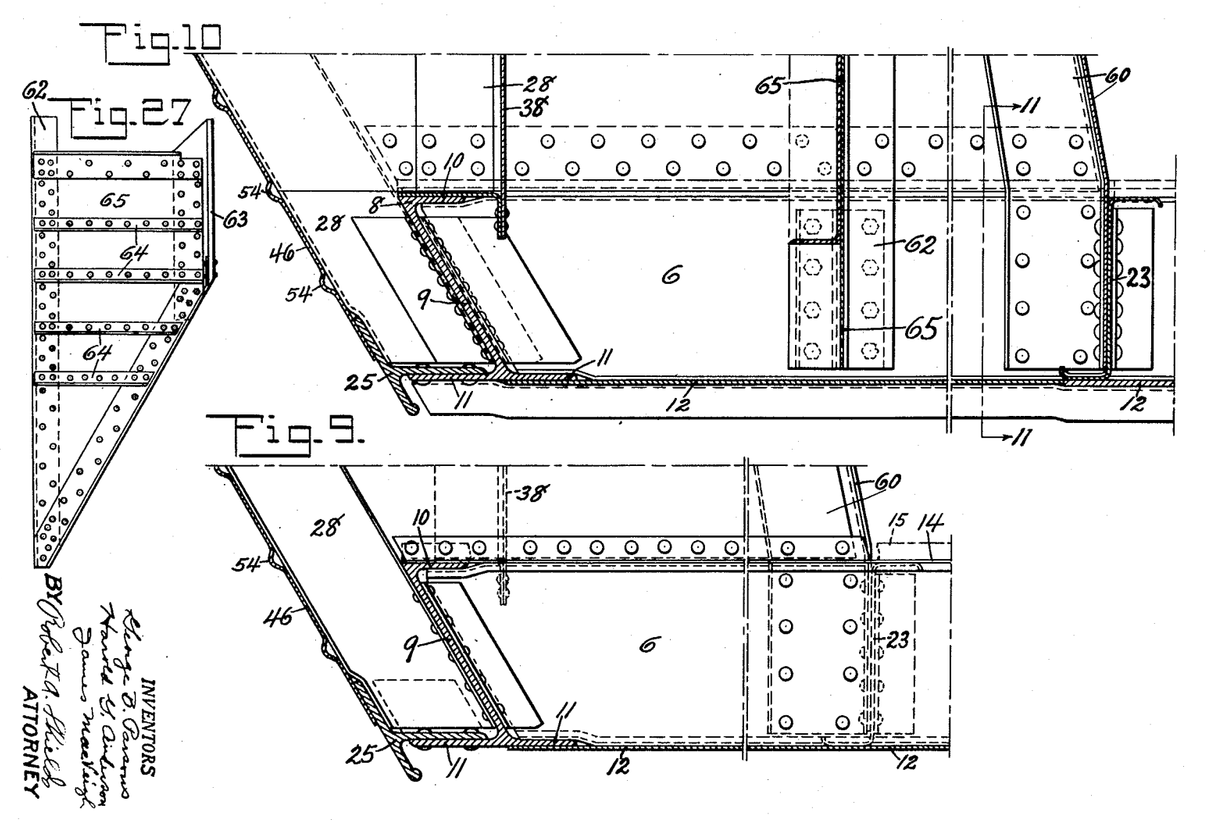
Figs. 9 and 10, Sheet 8, are sectional views taken on lines 9—9 and 10—10, respectively, of Figs. 1 and 2.
Fig. 27, Sheet 8, is an elevational view of a portion of an end bulkhead stiffener.
Figure 11:
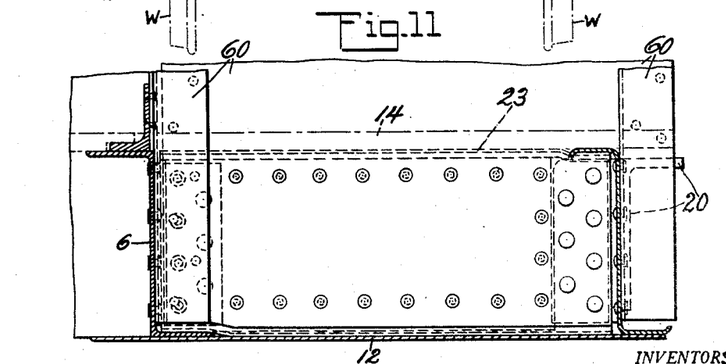
Fig. 11, Sheet 4, is a sectional view taken substantially on line 11—11 of Fig. 10.

The underframe sub-assembly unit, as best shown in Figs. 6, 7, 8, 12 and 30 to 34 inclusive, is made up of continuous channel center sill member 2, having outturned flanges 4 joined by cross bearers 6 of flanged Z cross-section and extending from the center sill to side sill members 8. The side sill members are formed with a sloping web 9, top flange 10 and bottom flange 11, which bottom flange extends on either side of the web 9. Flanges 11 of the side sill elements, flanges 4 of the center sill elements, and the bottom flanges of the flanged Z cross bearers 6 are connected together by a continuous flat sheet 12 tying all the elements rigidly together and preventing ballast from piercing the car floor. The car floor indicated at 14, Fig. 12, Sheet 9, is preferably made of light cellular material and covered by carpet or linoleum 15. In order to brace the cross bearers 6, Z cross-section longitudinals 16 extend between the cross bearers and are connected thereto as well as to the flat sheet 12. These longitudinals 16 are positioned beneath the seat supports S as clearly shown in Fig. 12. The cross members adjacent the ends of the underframe are additionally tied together by longitudinals 17 for the purpose of bracing the underframe structure and at the same time supplying support for certain of the wheel-connecting structures (not shown). For example, the additional longitudinals 17 disposed at the left hand end of Fig. 6 are adapted to receive the jacking or temporary support wheel structure R. As clearly shown in Fig. 6, the center sill and side sill elements project outwardly beyond the last or end cross bearers 6 for a purpose later to be described. The ends of the center sills outwardly of the end cross bearers have attached thereto cast or forged stiffeners 18 connected to the center sill and to a short Z section end member 20' stiffened by angle 20, and to which is attached part 22 of a coupling element. In order to additionally brace the end structure and angle 20, short longitudinals 23 are applied connecting the end Z member with the end cross bearer substantially in alignment with the inner longitudinal members 16. The end members and short longitudinals 23, together with the center sill extension, provide support for car flooring adapted to form the passageway between adjoining cars.

Figure 2:
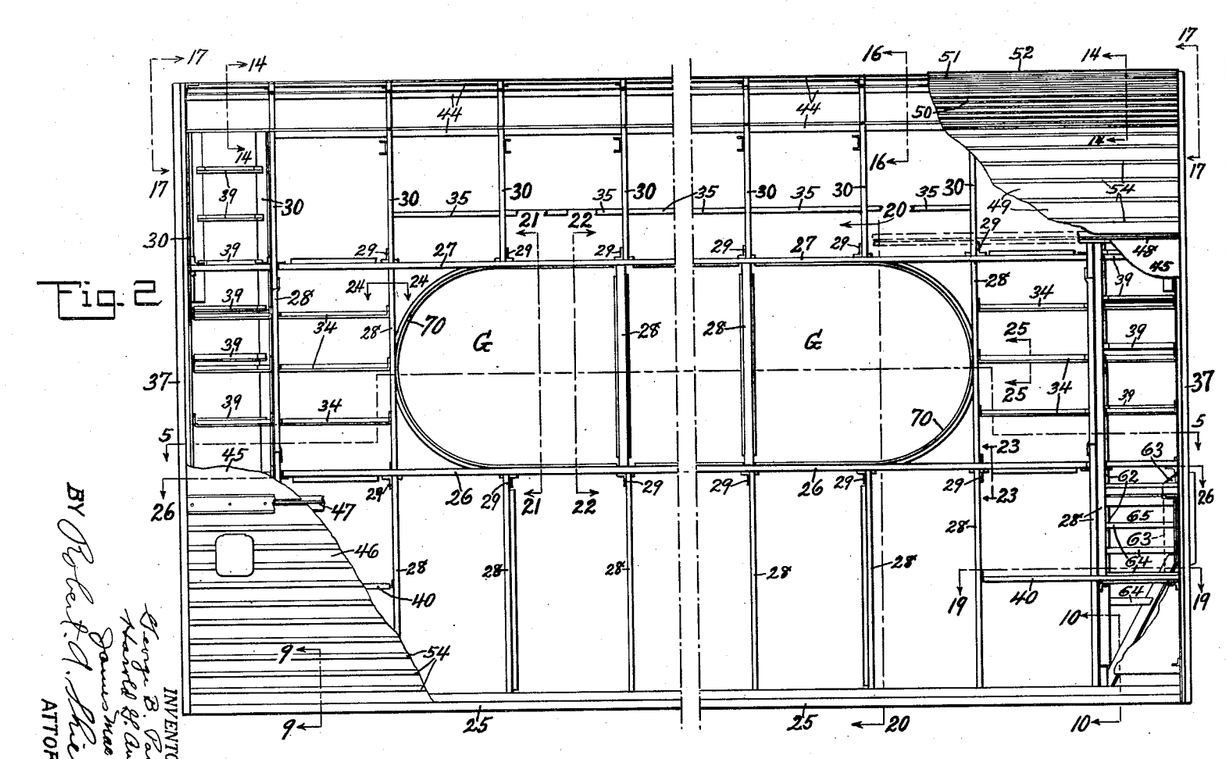
Fig. 2, Sheet 2, is an elevational view of a complete car with parts of the sheathing removed to better disclose the construction.
Figures 20, 21, 22, 23, 24, 25, 35, 36:
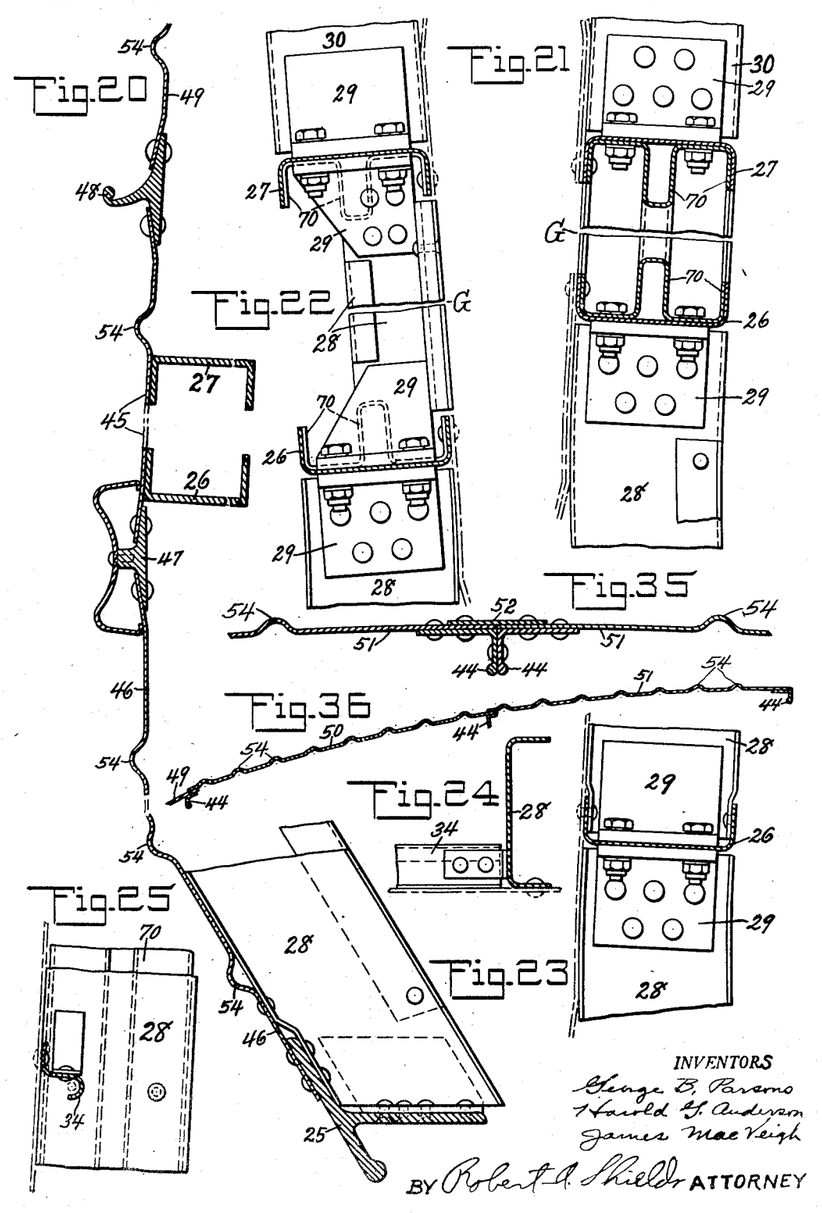
Fig. 20, Sheet 10, is an enlarged sectional view taken substantially on line 20—20 of Fig. 2 but showing merely the sheathing with most of the framing broken away.
Figs. 21 to 25 inclusive, Sheet 10, are sectional views taken substantially on correspondingly numbered section lines of Fig. 2, Sheet 2.
Fig. 35, Sheet 10, is an enlarged sectional view showing the connection of the body halves at the top center of the car.
Fig. 36, Sheet 10, is a sectional view through the top portion of the car and showing the roof arrangement and the supporting purlins, and
Fig. 37, Sheet 11, is a sectional view similar to Figs. 9 and 10, but showing a slightly modified construction in order to accommodate a side door.
Figure 26:
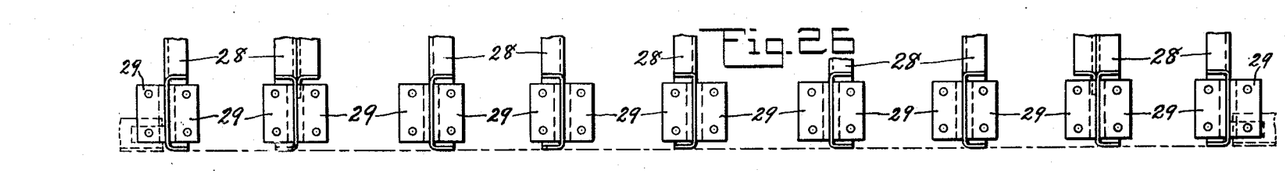
Fig. 26, Sheet 11, is a sectional view taken substantially on line 26—26 of Fig. 2.
Figure 28:
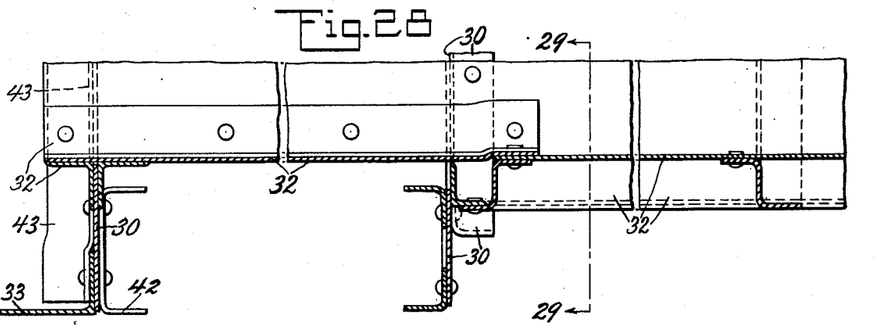
Fig. 28, Sheet 11, is a sectional view taken substantially on line 28—28 of Fig. 4.
Figure 29:
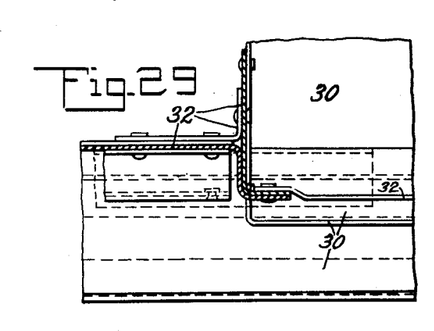
Fig. 29, Sheet 11, is a sectional view taken substantially on line 29—29 of Fig. 28.
Figure 30:
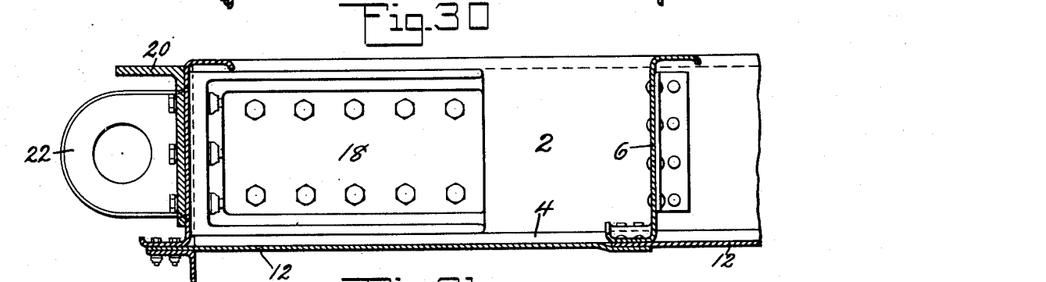
Figure 31:
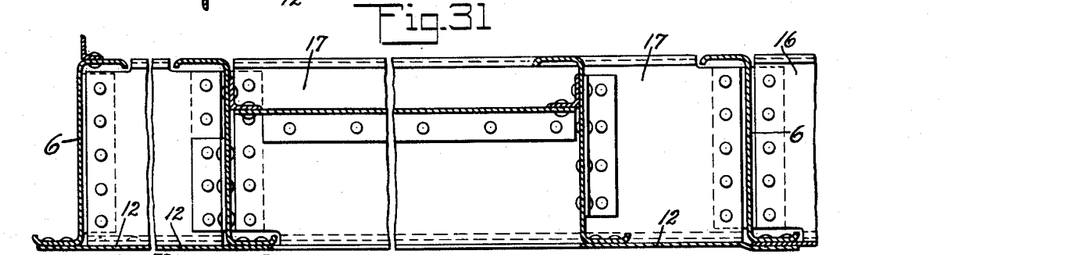
Figure 33:
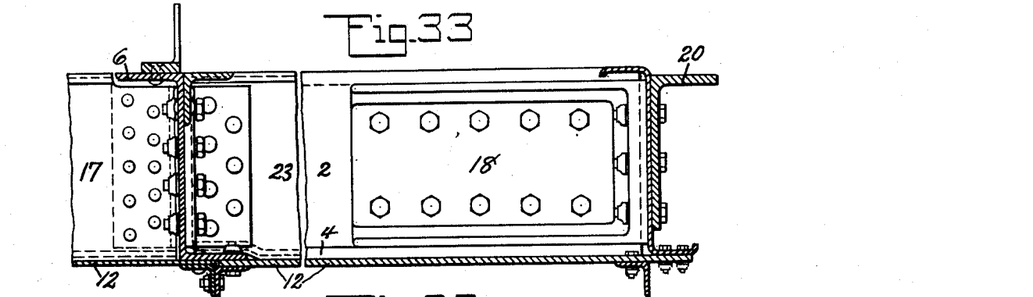
Figure 34:
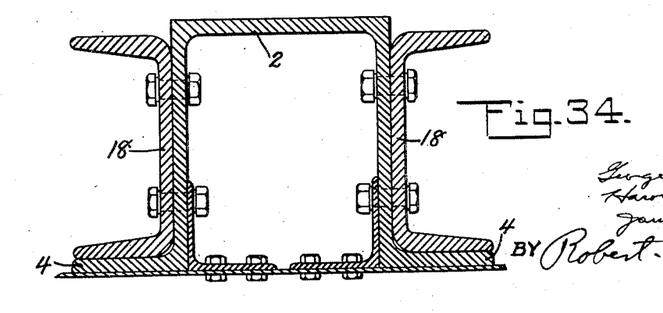
Fig. 34, Sheet 1, is a sectional view taken substantially on line 34—34 of Fig. 6, Sheet 6.

The body half sections are substantially identical and are preferably prefabricated as halves and then connected to each other and to the underframe in a manner later to be described. Each roof half and side construction is made up of a bottom chord 25, channel belt rail 26 having the flanges directed upward, and channel plate member 27 with its flanges directed downwardly. The bottom chord, belt rail, and header or plate 27 are continuous substantially from end to end of the car and are joined by discontinuous rib members 28 of channel cross-section, the rib members being firmly attached to the respective continuous longitudinals by means of angle or other clips 29 shown for example in Figs. 21 and 23. Upwardly of the plate or header 27 the rib members 30 increase in depth as they curve inwardly to form the roof half and are lightened by punching openings 31 therein. Rib members 30, like the rib members 28, are of channel cross-section preferably formed by attaching angles 33 to a web plate which in addition to openings 31 have portions cut away to provide space for reception of air conditioning or ventilating duct parts 32 fastened to and forming part of the roof framing. The cut out openings are preferably flanged or surrounded by angles so as not to materially reduce the strength of the member. As clearly shown in Figs. 1 and 2, certain of the ribs connecting belt rail 26 and header 27 are eliminated so as to provide openings for the windows G. All of the windows may be square or the end units may be rounded and framed into the structure by means of curved hat-shaped members 70. In order to compensate for the lack of a skin panel in the window area, short stiffeners 34 of flanged Z cross-section are connected to the ribs at each end of the window openings and also to the ribs at other points where it is necessary to strengthen the sheet or hold it in true alignment. Likewise stiffeners 35 join ribs 30 above the header in the window zine.

Figure 3:
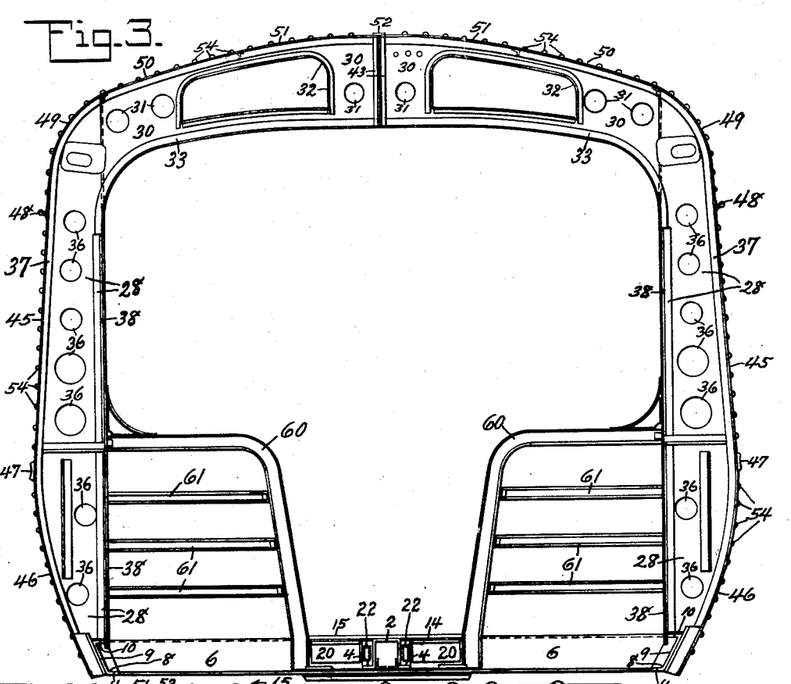
Fig. 3, Sheet 3, is a front end view of the car.
Figure 12:
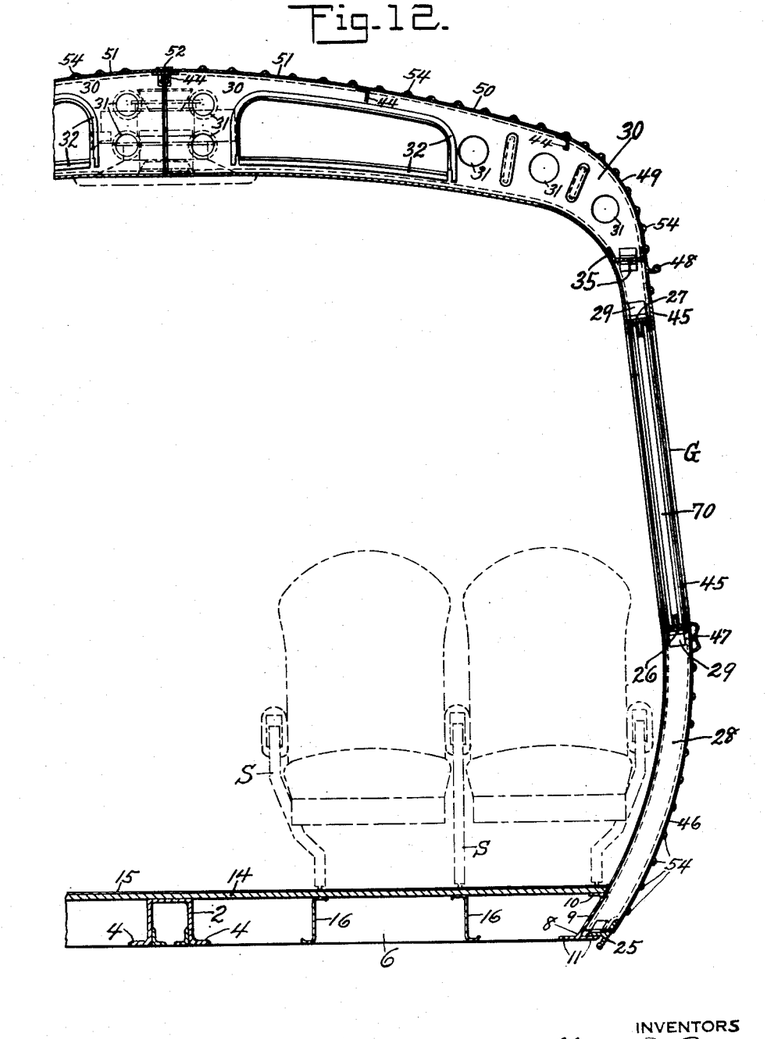
Fig. 12, Sheet 9, is a longitudinal sectional view taken substantially through the transverse center of the car.
Figure 13:
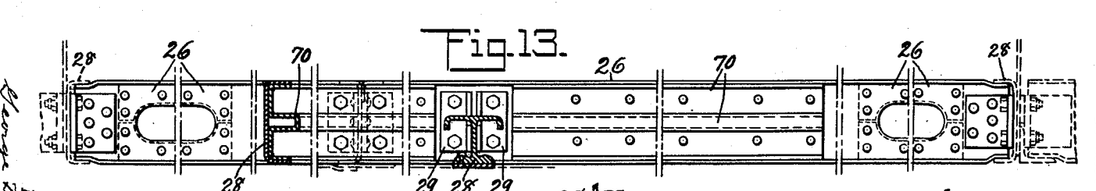
Fig. 13, Sheet 7, is a longitudinal sectional view taken through the windows.
Figures 14, 15:
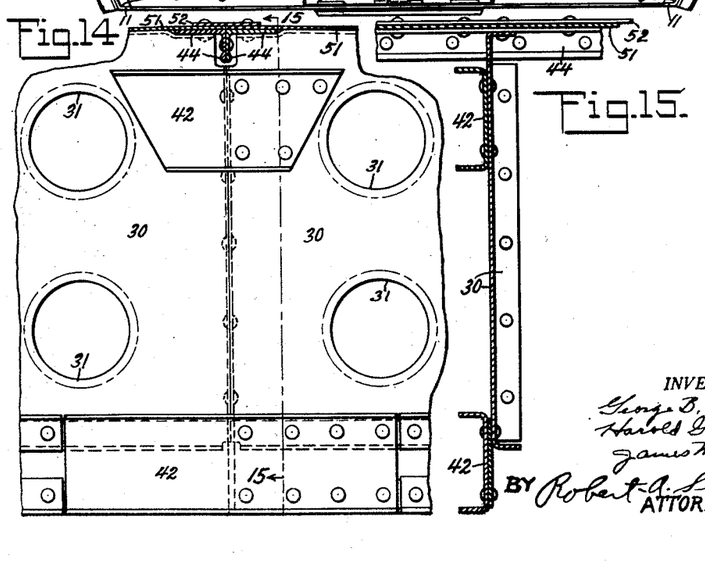
Fig. 14, Sheet 3, is a sectional view taken substantially on line 14—14 of Figs. 1 and 2.
Fig. 15, Sheet 3, is a sectional view taken substantially on line 15—15 of Fig. 14.
Figures 16, 32:
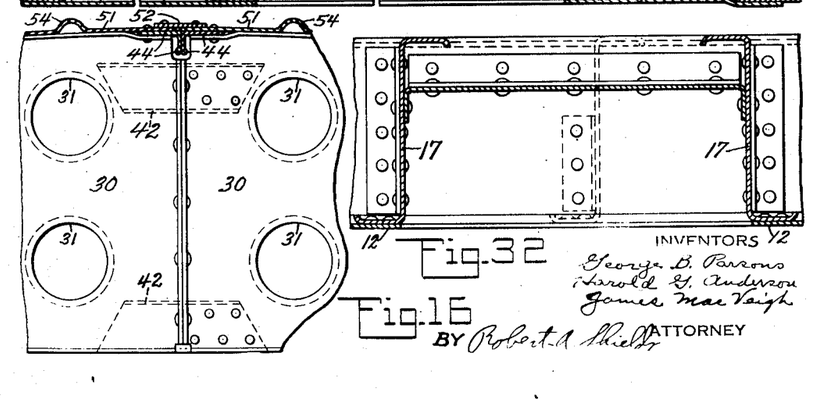
Fig. 16, Sheet 12, is a sectional view taken substantially on lines 16—16 of Figs. 1 and 2.
Figs. 30 to 33 inclusive, Sheet 12, are sectional views taken substantially on correspondingly numbered section lines of Fig. 6, Sheet 6.
Figure 17:
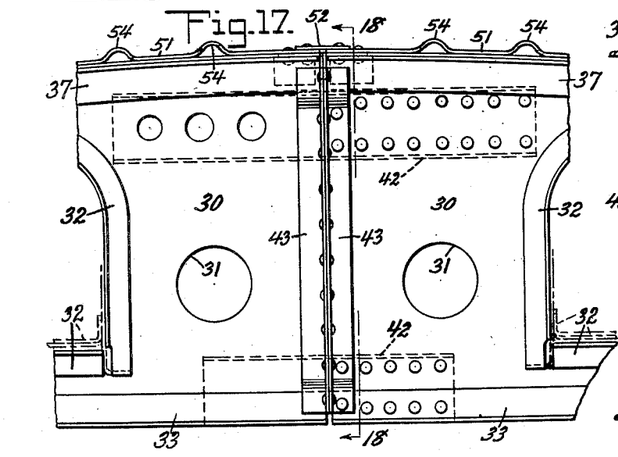
Fig. 17, Sheet 1, is an enlarged end view taken substantially on line 17—17 of Figs. 1 and 2.
Figure 18:
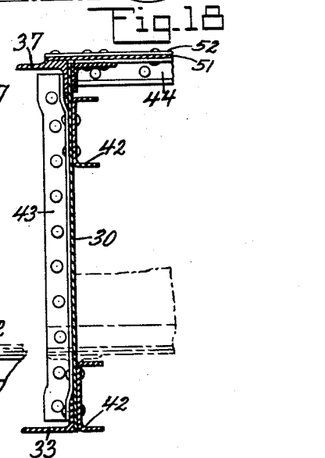
Fig. 18, Sheet 1, is a sectional view taken on line 18—18 of Fig. 17.
Figure 19:
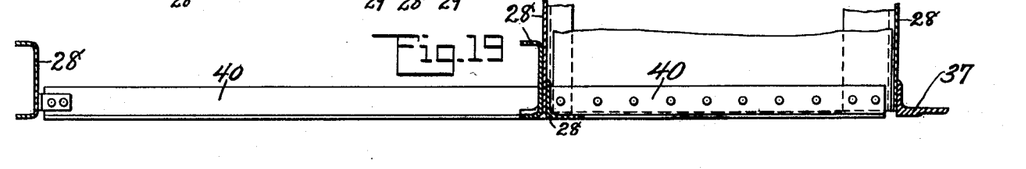
Fig. 19, Sheet 7, is a sectional view taken on line 19—19 of Fig. 2.

The rib members 28 connecting the bottom chord 25 and belt rail 26 and those connecting belt rail 26 and header 27 are of relatively shallow depth intermediate the ends of the car. The two end ribs, however, are of considerably increased depth and instead of following the body contour have their inner edges extending vertically from a point adjacent the inner edge of the underframe side sill as clearly shown in Figs. 3 and 4. These end ribs have lightening openings 36 cut therein and have their inner edges connected by a plate 38 and their outer edges connected by a plurality of short stiffeners 39, thus in effect forming box section end posts extending from the underframe upwardly for rigid connection with the inwardly curved ribs 30 previously referred to. In oder to stiffen the ends and provide place for attachment of a flexible closure (not shown) the extended angles 37 are attached to the ribs and to the sheathing. The ends are also braced by short longitudinals 40 connecting the three end ribs between the belt rail and bottom chord. Thus it will be seen that at the ends of the car adequately braced box section posts are provided which merge into the curved ribs and form in effect a continuous box arch extending from side sill to side sill of the completed car. Intermediate these box section end posts the ribs are of shallower depth, as clearly shown in Figs. 5 and 12, thus providing ample space for reception of the car seats or other equipment. In assembling the halves on the underframe the bottom chord 25 is adapted to rest upon and be attached to the flange 11 of the side sill element and the lower ends of ribs 28 are attached to the distorted web of the side sills. The inner ends of ribs 30 are connected by means of connecting bars 42, preferably of channel formation, and also by means of angles 43 fastened to the ribs and to each other, thus firmly tying the ribs 30 together at the longitudinal center line of the car to form continuous arcuate roof carlines. The ribs 30 are connected together longitudinally by purlins 44, the innermost of which are placed adjacent the center line and adapted to be connected together as shown in Fig. 12.

The body and underframing just described provides an extremely rigid skeleton to which the skin sheets may be attached. As shown, the skin sheets 46 beneath the window extend from the bottom chord 25 upwardly and outwardly to a T-shaped connecting bar 47 (Fig. 20), which extends quite continuously from end to end of the vehicle and which will, due to its proximity to the belt rail 26, serve as an additional belt rail area stiffener. Sheets 45 extend upwardly from the T-shaped stiffener and are connected to both the belt rail 26 and header 27 and extend beyond the header for connection to the J-shaped combined connector and drip element 48. This drip element, like the T stiffener 47, extends quite continuously from end to end of the car and, due to its close proximity to header 27, serves as a part thereof. The roof sheets 49, 50 and 51 extend inwardly and upwardly from the drip rail to the center of the car and overlap each other and are connected together in shingle fashion at the purlins. The adjacent roof sheets 51 have their adjacent edges connected together and sealed by a flat connecting plate 52 extending continuously from end to end of the car and together with the central purlins 44 form a part of the connection between the side halves. In order to rigidify the side sheets they are provided with longitudinally extending corrugations 54 extending from end to end of the car and effectively stiffening the sheets and skeleton structure. The connection of the skin sheet and its stiffening in the manner shown and described will cause the skin to serve as a stress element of the car body and the connecting drip rail and T connection will effectively serve as additional longitudinal stiffeners in the belt rail and header or plate area.

Figure 4:
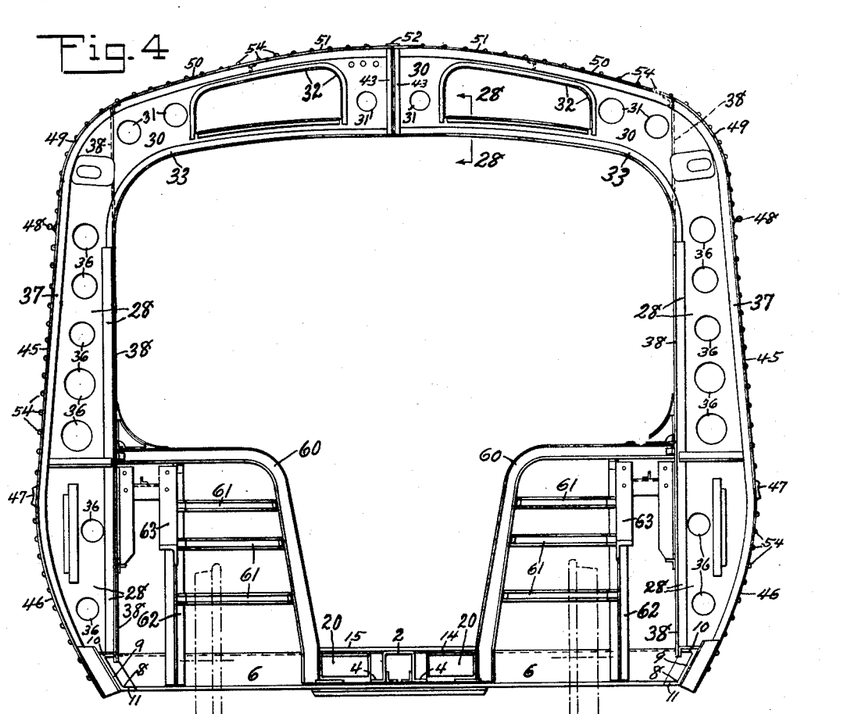
Fig. 4, Sheet 4, is a rear end view of the car.
Figure 5:
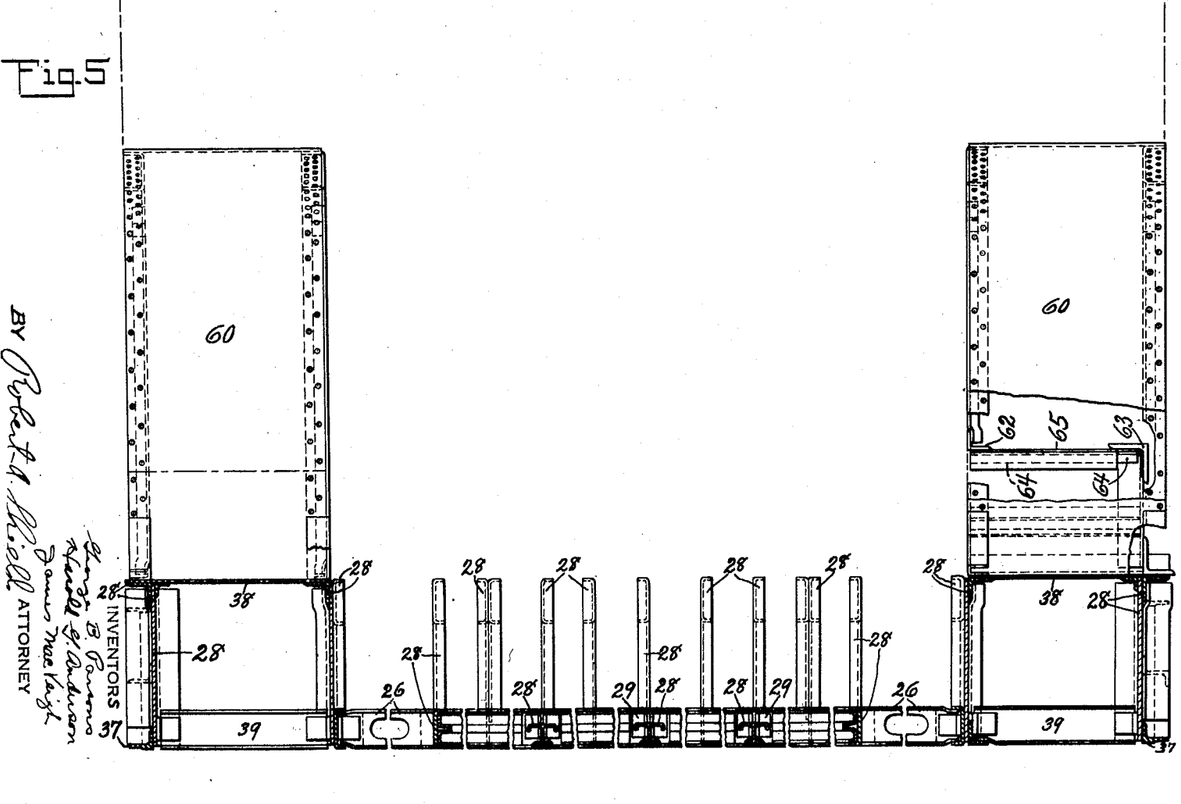
Fig. 5, Sheet 5, is a sectional view taken substantially on line 5—5 of Fig. 2.

In order to house the wheels W housings 60 are built into the structure and connect the lower portions of the box section end posts or arches to the underframe adjacent the center of the car. These housings are made quite strong and adequately braced as at 61 to prevent any possibility of damage tereto by flying ballast and to also serve as effective knee braces or buttresses for the lower ends of the box section posts or arches. The housings at the rear end of the car, as shown in Fig. 4, are additionally braced by verticals 62 to which are attached castings or similarly formed members 63 for the attachment of wheel supporting strut structures. Verticals 62 and members 63 are tied together by horizontals 64 and web 65 thus forming a beam to take the strut structures. These strut structures will support the rear end of the body on the wheels W which are thereby connected to and form a part of the body. The arch or post members at the front end of the car (Fig. 3) are adapted to receive socket structures shown in the right hand end of Fig. 1 of application Serial 733,098, and which will permit the forward end of the car to be supported on a bayonet like structure carried at the rear end of the preceding car. Thus it will be seen that the car is supported wholly at its ends by means of attachments to the box section end posts or arches to which the remainder of the car is rigidly and adequately attached.

Figure 37:
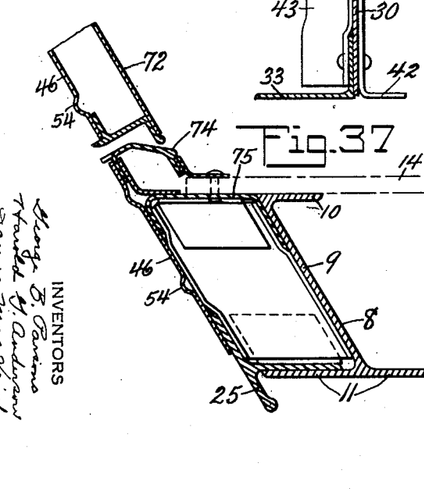

In the window openings the glass units may be firmly attached and sealed to flanged hat-shaped members 70 (Figs. 21 and 22), which are firmly attached to the headers and belt rail and to the ribs 28 bounding the window openings. Since the cars are intended to be fully air conditioned and are extremely rigid, the windows may be sealed and firmly attached to these rigid flanged hat-shaped members, which effectively stiffen and strengthen the headers and the belt rail in the window zone. The cars are usually quite short and accordingly all cars do not have side entrance doors, but in cases where side doors are needed these may be readily applied by cutting out the side sheets 46 and installing a door 72 (Fig. 37). The opening in these sheets will be bounded by a deformed bulb angle member 74 which is firmly attached to the sheets and adjacent framing. Also, since the floor 14 will not be stiffened in the door opening, a downwardly directed channel member 75 is attached to the side sheets and underframe in the door opening zone.

By constructing the cars as shown and described extremely rigid yet light weight structures may be provided, with each car provided with only two wheels located at one end only of the car, thus the number of wheels and axles is cut to an absolute minimum for a stable operation and, since the car bodies are of extremely light construction, the wheels and axles may likewise be of light construction. For example, a car built in accordance with the preceding disclosure and utilizing steel and aluminum alloys, can be completed and have a finished weight ratio to carry passengers of 5,570 pounds. Since each car can comfortably carry 16 passengers, the dead weight per passenger ratio will be approximately 350 pounds, which is much less than the dead weight per passenger ratio of any present-day automobile or pleasure car. It is intended that four passenger carrying cars be connected, with an identical car carrying all sanitary facilities as well as water tanks, air conditioning equipment, etc. These four passenger carrying cars, together with the one equipment car, will provide all facilities of a present-day railway coach and will seat 64 passengers with a total dead weight ratio to run of 29,900 pounds, thus giving a dead weight per passenger ratio of 467 pounds, which is still lower than any conveyance offering equal facilities. The lowest weight passenger car which was intended for suburban service, is shown in the 1946 Car Builders Cyclopedia at page 613. This car has a running weight of 108,000 pounds and a seating capacity of 34, giving a dead weight per passenger ratio of 1,290. It will thus be seen that by the present design a car is provided having a dead weight per passenger ratio lower than comparable means of transportation. Also, since parts of the underframe, wheels and axles must be of steel, a large portion of the weight is located very close to the rails. The lowering of the underframe to a point in the plane of or below the running wheel axles will permit material lowering of the entire car body, with the result that the center of gravity of the loaded car will be less than two feet above the top of the running wheels. With such a position it will be evident that extremely high speeds may be obtained without danger and without excessive banking of the tracks.

While the car has been described more or less in detail with specific reference to one form of car, it is obvious that other forms of car may be made without departing from the scope of the invention as defined by the following claims.

What is claimed is:

1. In a railway body frame the combination of, a bottom chord member extending from end to end of the frame, an upwardly open channel belt rail member extending from end to end of the frame, a downwardly open channel header member extending from end to end of the frame, channel form rib members interposed between and connecting said chord, belt rail and header member, sheathing strips extending longitudinally of the body and secured thereto with their side edges in spaced relationship, and longitudinals connecting said sheathing together and to said ribs and serving as strength members of the body frame.

2. In a railway body frame the combination of, a bottom chord member extending from end to end of the frame, an upwardly open channel belt rail member extending from end to end of the frame, a downwardly open channel header member extending from end to end of the frame, channel form rib members interposed between and connecting said chord, belt rail and header member, sheathing strips extending longitudinally of the body and secured thereto with their side edges in spaced relationship, a T section member extending from end to end of the body adjacent the belt rail and being secured to the outer surface of the ribs adjacent the belt rail and to the adjacent edges of the sheathing strips.

3. In a railway body frame the combination of, a bottom chord member extending from end to end of the frame, an upwardly open channel belt rail member extending from end to end of the frame, a downwardly open channel header member extending from end to end of the frame, channel form rib members interposed between and connecting said chord, belt rail and header member, sheathing strips extending longitudinally of the body and secured thereto with their side edges in spaced relationship, a T section member extending from end to end of the body adjacent the belt rail, and a J section member extending substantially from end to end of the body adjacent the header, said members being secured to the outer surfaces of the ribs adjacent the belt rail and header respectively and also connecting the adjacent edges of the sheathing strips.

4. In a railway body frame the combination of, a bottom chord member extending from end to end of the frame, an upwardly open channel belt rail member extending from end to end of the frame, a downwardly open channel header member extending from end to end of the frame, channel form rib members interposed between and connecting said chord, belt rail and header member, sheathing strips extending longitudinally of the body and secured thereto with their side edges in spaced relationship, a T section member extending from end to end of the body adjacent the belt rail, and a J section member extending substantially from end to end of the body adjacent the header, said members being secured to the outer surfaces of the ribs adjacent the belt rail and header respectively and also connecting the adjacent edges of the sheathing strips, all of said members and sheathing being framed into enlarged box-arch portions at the ends of the frame adapted to support the frame.

5. In a railway car the combination of, a rigid underframe, a body having side walls each including a plurality of ribs secured at their lower edges to said underframe, plates extending across and secured to the inner faces of the pairs of ribs at each end of the walls, and stiffeners between each pair of end ribs and secured to the outer faces thereof, said pairs of end ribs, plates and stiffeners forming box-like end members of a thickness materially greater than the general side wall thickness.

6. In a railway car, side and roof framing including a longitudinally extending header member, a longitudinally extending member of J cross-section above the header having the flanges positioned vertically and the leg extending substantially horizontally and serving as a drip moulding, a skin sheet overlapping and secured to the header member end to the lower flange of the J member, and a longitudinally extending skin sheet above the J member having its lower edge portion over-lapping and secured to the upper flange of the J member.

7. A railway car underframe having side sills, a continuous center sill substantially coextensive with and spaced from the side sills, a plurality of spaced cross bearers connecting the side and center sills, said side and center sills extending longitudinally beyond each of the end cross bearers, stiffeners connected to each side of the longitudinally extending portions of the center sill, longitudinal members secured to the end cross bearers in substantially parallel spaced relation with and between the stiffeners and side sills, transversely extending end member secured to the projecting ends of the stiffeners and the adjacent longitudinal member, a stiffener angle member fixed to each transversely extending member, and a coupling element secured to each stiffener angle member.

8. In a railway car, a combination of a rigid underframe part, a pair of combined side and half-roof skeletal frame superstructure parts substantially coextensive with the underframe and including vertical and horizontal members, means securing the lower edge of the superstructure parts to the side edges of the underframe, means securing the top edges of the superstructure parts together in abutting relation substantially at the longitudinal center line of the car, sheathing covering said frame parts and secured to the vertical and horizontal members and to the underframe parts and serving as a strengthening member for the parts, the upper edges of the sheathing of said skeletal parts being arranged in abutting relation substantially at the vertical longitudinally extending center plane of the car, and a cover plate fixed over the abutting edges of the sheathing of said skeletal parts and tying said sheathing and superstructure parts together at the longitudinal center line of the car.

9. In a railway car formed of three main parts comprising, a rigid underframe part and a pair of combined skeletal side and half-roof frame superstructure parts substantially coextensive with the underframe and including vertical and horizontal members certain of which constitute purlins along the upper edge portions thereof, means securing the lower edge portion of the superstructure parts to the side edges of the underframe part, means securing the upper edge purlins of the superstructure parts together in abutting relation to form a double strength purlin substantially at the longitudinal center line of the car, separate sheathing covering and secured to the vertical and horizontal members of said skeletal parts and to said underframe, and a plate secured to the separate sheathing and attaching the same to said double strength purlin.

10. In a railway car, a rigid underframe, a pair of combined side and half-roof skeletal frame structures secured together at their upper edges adjacent the longitudinal medial plane of the car and secured to the sides of the underframe at their lower edges to form the body, said frame structure including vertical ribs joined by longitudinals having a substantially common outer surface and each pair of end ribs being materially thicker transversely of the car than the intermediate ribs, plates secured to the inside of each pair of end ribs and extending longitudinally of the car across the space therebetween, sheathing extending across and secured to the outer faces of the ribs and longitudinals and to the bottom surfaces of said underframe, and reinforcing brace members in the box-like end posts formed by the pairs of ribs, plates and sheathing.

11. In a railway car, a rigid underframe, a body having a pair of combined side and half-roof skeletal frame structures secured together at their upper edges adjacent the vertical longitudinally extending medial plane through the car and secured to the sides of the underframe at their lower edges, said frame structures including vertical ribs joined by longitudinals having their outer surfaces disposed in a common surface with said ribs and each pair of end ribs being materially thicker transversely of the car than the intermediate ribs, plates secured to the inside of each pair of end ribs and extending longitudinally of the car across the space therebetween, sheathing extending across and secured to the outer faces of the ribs and longitudinals, reinforcing brace members in the box-like end posts formed by the pairs of ribs, plates and sheathing, and wheel housing framing secured to each pair of end post structures and the underframe, the wheel housings at each end of the car being spaced to provide an aisle below the tops of the wheels in the housings.

12. A railway car underframe comprising side sills, a continuous center sill substantially coextensive with and spaced from the side sills, crossbearers connecting said side and center sills adjacent to but inwardly of the ends thereof, whereby said side and center sills extend longitudinally outward at each end of the underframe beyond the crossbearers, a bottom cover plate extending between the crossbearers and secured to the sills and crossbearers, and longitudinal members extending between said crossbearers and secure thereto and to said bottom cover plate to thereby form a braced underframe having side and center sills projecting longitudinally outward from each end.

13. In a railway car frame, the combination of a rigid underframe comprising a longitudinal center sill and side sills and a plurality of crossbearers connecting said sills, body framing secured to said isde sills and comprising a plurality of spaced apart parallel longitudinals extending substantially the entire length of the car, a plurality of substantially vertical ribs connected to such longitudinals and to said side sills, said ribs having their outer surfaces located substantially in a common surface with the outer surface of said longitudinals, a plurality of top ribs curving inwardly and upwardly from said longitudinals and connected together at their inner ends substantially on the longitudinal vertical center plane of the car to thereby form arcuate carlines, a pair of said ribs at each end of the car frame being thickened transversely of the car and forming a strong arch between the side sills and supporting the car at the ends, and metal plates substantially encasing the longitudinal surfaces of said car frame, said metal plates being secured directly to the outer surfaces of said sills, crossbearers, ribs and longitudinals, and forming a load bearing portion of the car.

References Cited in the file of this patent

UNITED STATES PATENTS

| Number | Name | Date |
|---|---|---|
| 2,035,113 | Blomberg | Mar. 24, 1936 |
| 2,056,219 | Stout et al. | Oct. 6, 1936 |
| 2,098,949 | Geissen | Nov. 16, 1937 |
| 2,185,975 | Dean | Jan. 2, 1940 |
| 2,190,334 | Nystrom | Feb. 13, 1940 |
| 2,197,708 | Ragsdale et al. | Apr. 16, 1940 |
| 2,217,034 | Van Dorn | Oct. 8, 1940 |
| 2,223,746 | Stoner | Dec. 3, 1940 |
| 2,239,634 | Thunstrom | Apr. 22, 1941 |
| 2,247,273 | Blomberg | June 24, 1941 |
| 2,250,523 | Christiansen et al. | July 29, 1941 |
| 2,331,891 | Dean | Oct. 19, 1943 |
| 2,462,666 | Omar | Feb. 22, 1949 |
| 2,476,451 | Murphy | July 19, 1949 |

FOREIGN PATENTS

| Number | Country | Date |
|---|---|---|
| 647,370 | Germany | July 3, 1937 |
| 159,301 | Spain | Nov. 11, 1942 |
| 163,239 | Spain | Sept. 30, 1943 |

OTHER REFERENCES

Foreign Commerce Weekly (publ.), pages 8 and 9, November 25, 1944.